United States Patent Office 3,288,180
Patented Nov. 29, 1966

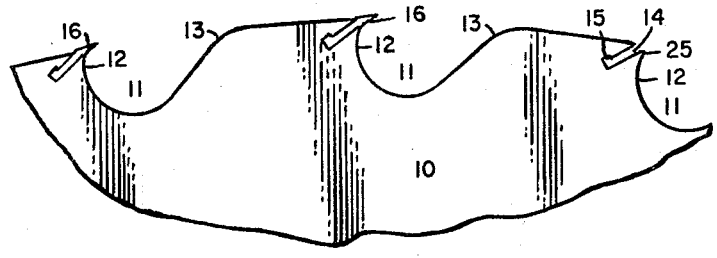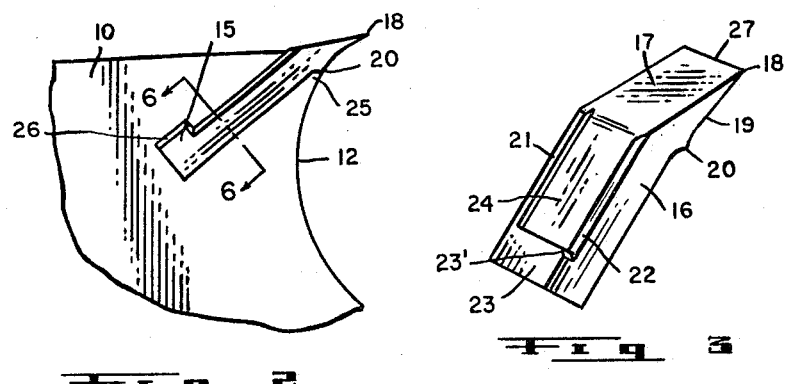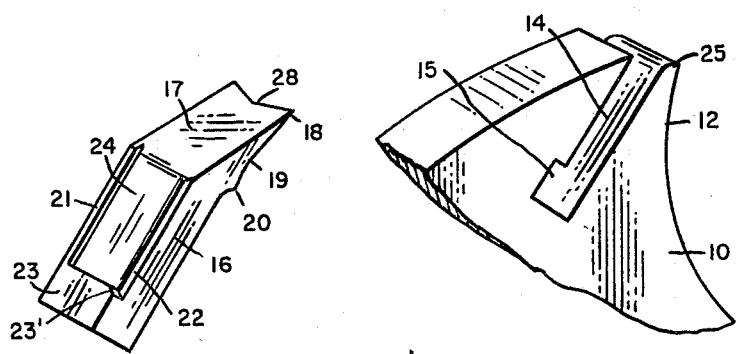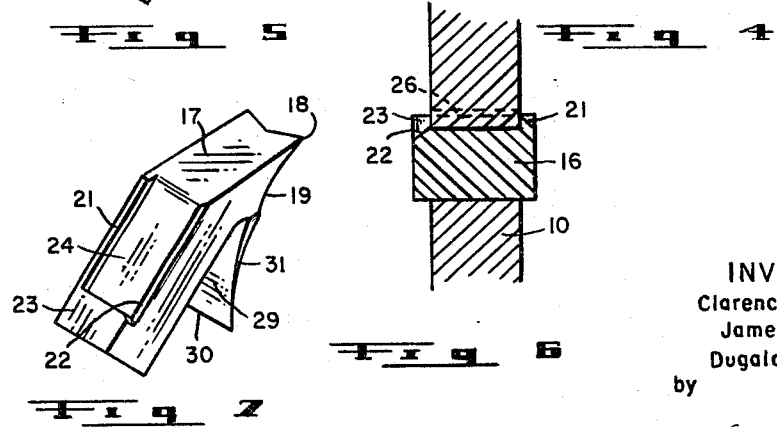

3,288,180
INSERTED TOOTH SAW
Clarence F. McLean, James C. McLean, and Dugald R. McLean, all of R.R. 1, Rainy River, Ontario, Canada
Filed May 18, 1964, Ser. No. 368,294
4 Claims. (Cl. 143—145)

This invention relates to saws having releasably inserted teeth, the base plate of said saws being either circular or of straight design. It is known that a number of such saws have been patented, although none appear to be on the market at the present time. A number of such saws have been designed with teeth the same thickness as the saw plate, relying on pins, V-shaped length grooves, and friction to hold the teeth in place. Pins are soon loosened by vibration, side pressures open the V-shaped slots against resilient friction, and teeth escape. Others have teeth wider than the saw plate, to span same, while bent over tongues lock the teeth to the plate. The same vibrations loosen the tongues and they break. Some are inserted in tapered slots from the periphery of circular saws with pressure. The pressures are inclined to warp the saws out of shape, while centrifugal force may suddenly release them in a dangerous manner.

The principal object of the present invention is to provide a saw plate and unit teeth which can be quickly inserted in the plate from the side thereof, in suitable evenly spaced notches therearound, and not necessarily at every notch as no tensions will be built up in the plate.

A further object of the invention is to provide beveled edges on the teeth for easy wedge entrance into the notches of the plate, while providing stop means to centrally position the teeth across the plate, so the side pressures will be balanced and the teeth cannot escape.

A further object of the invention is to design the teeth wider than the saw plate, so said plate will be clear and not bind in the resulting saw cut when in operation.

A further object of the invention is to provide a positive lock between the teeth and the saw plate, to prevent any possibility of the teeth escaping radially by centrifugal force.

A further object of the invention is to design the teeth either for ripping or for cross cutting, without changing the fastenings between said teeth and the saw plate.

A further object of the invention is to provide means on the teeth for reducing wear on the saw plate at the throats thereof.

Still further objects of the invention are: to design said saw plate and teeth in a simple manner; for ease of construction and hence economical manufacture; yet in a durable manner for long and satisfactory use in operation; and such that said teeth can be easily removed from the saw plate when outworn, ready for replacements.

With the above important and other minor objects in view, which will become more apparent as the description proceeds, the invention consists essentially in the arrangement and construction of the various parts hereinafter more particularly described, reference being had to the accompanying drawings wherein like characters of reference indicate corresponding parts in the several figures, and wherein:

FIGURE 1 is a partial side view of a circular saw base plate, showing teeth inserted therein adjacent the throats thereof.

FIGURE 2 is an enlarged view of the central part of FIGURE 1, and showing tooth details.

FIGURE 3 is an enlarged perspective of a rip tooth for insertion in the saw base plate.

FIGURE 4 is an enlarged perspective view of a tooth receiving notch of the saw plate, ready for receiving the tooth shown in FIGURE 3.

FIGURE 5 is a perspective view of a tooth similar to FIGURE 3, but for cross cutting purposes.

FIGURE 6 is an enlarged cross section taken on the line 6—6 of FIGURE 2.

FIGURE 7 is a modified view of a tooth similar to FIGURE 5, but showing a downward extending apron to protect the rear wall of a saw plate throat.

A partial circular base plate for a saw is shown at 10 in FIGURES 1 and 2. The outer periphery of this plate is provided with semi-circular cut-outs 11 in spaced relation therearound, which form throats for removal of teeth cuttings. These throats curve gently into the plate from the periphery of the saw plate, as shown at 12, and their front ends curve back to again merge into the periphery, as shown at 13. At each juncture of a throat wall 12 with the periphery of the plate, angular notches 14 are provided, one at each juncture. The lower ends of these notches are each offset or enlarged, as at 15, resulting in an L-shape to the notch. This L-shape is clearly brought out in FIGURE 4.

An attachable tooth 16, for reception in a notch 14, is shown in FIGURE 3. This tooth is relatively rectangular in cross section, but one end has the upper corner sliced off as shown at 17, to form a chisel-shaped point, indicated at 18. This point is slightly lower than the bottom of the rear rectanguar portion, and the back part of the chisel curves, as at 19, to a downwardly projecting ridge 20 across the lower front end of said rectangular portion, defining a kind of curved arrowhead-shape to the front of the tooth. One upper side corner of the tooth has a slight wall or stop 21 there along, while the opposite side corner is slightly beveled, as at 22, both the stop and the bevel extending from the top of the sliced-off corner 17 to a rear elevated cross wall or stop 23, which is the same height as the stop 21. This cross stop has a beveled corner 23' as a vertical extension of that 22, and is the same width as the offset 15 of the notch 14. Accordingly, it will be seen that the surface 24 of the tooth is bounded by stop 21, cross stop 23, the bevel 22 and the upper bend of the sliced-off corner 17.

In attaching the teeth 16 to the saw plate 10, the beveled side is placed in a notch 14, with the beveled cross stop 23 aligned with the offset 15, while the cross ridge 20 is above the juncture point 25 of the notch 14 and throat wall 12. The thickness of the teeth (from the surface 24 to the bottom of the tooth) is the same as the width of one of the notches 14. Accordingly, when the tooth is side pressed into a notch, up to the stop 21, it forms a tight fit therewith, but without any warping effect on the saw plate, while the beveled side insures entrance. At the same time, the cross stop 23 wedge enters and is a horizontal tight fit in the offset 15 to insure that the tooth cannot move endwise. The offset is made deeper than the height of the cross stop, so a clearance 26 is provided and the holding friction is principally on the walls of the notch 14.

It will be noted that the point 18 of the chisel-shape is well out from the periphery of the saw plate, and at a good cutting angle, while the back of the chisel curves into perfect alignment with the wall portion 12 of the throat, due to the ridge 20, so that all cuttings from the point will curl into the throat for escape. It will also be noted in FIGURE 6 that the tooth sides extend the same amount from the plate so the tooth is centered across said plate.

In view of the above it will be obvious that when the saw is operated through wood, the side friction on the teeth sides will be even to maintain it in place, without any tendency for side movement, especially as the friction between the teeth and the notches is sufficient to prevent such movement by vibration. As there is no warping tensions created in the saw plate, it is not necessary for all teeth to be in their place. A lesser number can be used as long as they are spaced evenly therearound. This is a big advantage in certain work.

The straight across chisel point shown at 27 in FIGURE 3 forms a perfect tooth for ripping through wood. It will be understood that this blade edge should be slightly wider than the rest of the tooth, to prevent binding, and of course the saw plate will be clear, due to the teeth extending on each side thereof. By changing the blade point 27 of FIGURE 3 to a shallow V-shaped blade, as shown at 28 in FIGURE 5, a perfect cross cut tooth is provided, which produces a smooth-sided cut cross the grain of the wood. As this tooth cuts from each side, a further centering is provided to maintain the tooth in place on the saw plate.

By observing FIGURES 3 and 5 it will be noted that the stops 21 and 23 are flush, and the ridge 20 is ahead of the front end of the stop 21. Due to this construction, the teeth can be stacked one on top of the other, with the ridge of the top one resting on the surface 17 of the bottom tooth. Accordingly, they could be so placed in a magazine of a suitably designed tool (not shown) for inserting the teeth in the saw plate. No doubt the same tool could also be designed to remove the old teeth.

While the above teeth are very satisfactory, it is contemplated to also provide such teeth with a front apron, shown at 29 in FIGURE 7. The apron will fit the front wall 12 of the throats to prevent wear of the soft material by the cuttings. This apron will be a thin curved blade down to a knife shaped bottom 30. The sides of this apron will taper from the chisel-shaped nose of the tooth down and inward, as shown at 31, so the sides of the knife-shaped bottom will be flush with the sides of the plate 10.

What we claim as our invention is:

1. The combination of a saw plate and teeth for insertion therein, comprising: a series of equi-spaced angularly positioned notches through said plate along and from an edge thereof; an offset at the bottom of each notch; a series of rectangular teeth, each wider than the thickness of said plate and insertable in one of said notches from the side thereof; a beveled edge along one side of each tooth for wedging entrance of said teeth into said notches, when side pressed thereagainst in said insertion; each of said teeth having a chisel-shaped end protruding outwardly past said plate edge, when said teeth are in said notches; a stop on the other side of said tooth for contact against a side of said plate in said tooth insertion, to centrally position the tooth across said plate; and a cross stop at the opposite end of each tooth for offset entrance, when said teeth are inserted in said notches as aforesaid.

2. The combination of a saw plate and teeth for insertion therein, comprising: a series of equi-spaced angularly positioned L-shaped notches through said plate along and from an edge thereof; a series of inwardly curved throat cut-outs along said plate edge, each adjacent one of said notches and forming a juncture point therewith; a series of rectangular teeth, each wider than the thickness of said plate and pressure insertable in one of said notches from the side thereof; each of said teeth having a chisel-shaped end protruding outwardly past said plate edge when said teeth are notch received; a beveled edge along one side of each tooth for wedge entrance of said tooth into one of said notches in a neat fit; a stop on the other side of each tooth for contact against a side of said plate in said tooth insertion, to centrally position the tooth across said plate; a cross stop at the opposite end of each tooth; a side bevel on said cross stop for wedge entrance of said latter stop into one of the offsets of said L-shaped notches without play, when the tooth is inserted therein; a ridge across the bottom face of each of said teeth adjacent said chisel-shaped end, for contact with one of said juncture points therebelow and for aligning said bottom face with the adjacent wall of one of said throat cut-outs, when said teeth are inserted as aforesaid.

3. The combination of a circular saw base plate and unit teeth for removable insertion therein, comprising: a series of equi-spaced tangentially positioned L-shaped notches in and around the periphery of said plate; a series of semi-circular throat cut-outs in and along said periphery, each adjacent one of said notches and forming a juncture point therewith; a series of rectangular L-shaped teeth, each wider than the thickness of said plate, adapted to snug fit one of said notches, and pressure insertable from the side thereof; each of said teeth having a projecting chisel-shaped end presenting a cutting point; a stop along one side of each tooth; a bevel along the opposite side of each tooth, including a corner of the offset thereof; a ridge across the bottom of each of said teeth; the back face of the chisel-shaped teeth ends each curved to the summit of said ridge; and said cutting points projecting past the periphery of said plate, said bevels providing a wedge entrance for said teeth, said side stops adapted to contact the side of said plate to centrally position the teeth there across, the offset forming the L of each tooth receivable in the L offset of one of said notches in a snug width fit, and said curved back face alignable with the adjacent edge of one of said throat cut-outs at said junction points, all in the insertion of said teeth in said notches, as aforesaid.

4. The combination of a saw base plate and teeth for insertion therein, as described in claim 1, wherein apron means are carried by the back of the chisel-shaped ends of each tooth, to project down into one of said cut-outs, to protect the wall of said cut-out against wear.

References Cited by the Examiner

UNITED STATES PATENTS

| 534,220 | 2/1895 | Kent | 29—105 |
| 1,340,474 | 5/1920 | Cashman | 29—105 |

FOREIGN PATENTS

| 295,836 | 12/1916 | Germany. |
| 356,554 | 7/1922 | Germany. |

DONALD R. SCHRAN, *Primary Examiner.*